United States Patent
Ghebremeskel et al.

(10) Patent No.: US 11,384,276 B2
(45) Date of Patent: Jul. 12, 2022

(54) PARTICULATE PLUGGING AGENT BASED ON HYDROPHOBICALLY-MODIFIED VINYL ALCOHOL POLYMERS

(71) Applicant: KURARAY CO., LTD., Kurashiki (JP)

(72) Inventors: Ghebrehiwet Ghebremeskel, Houston, TX (US); Keisuke Morikawa, Houston, TX (US); Takuma Kaneshima, Houston, TX (US)

(73) Assignee: KURARAY CO., LTD., Kurashiki (JP)

(*) Notice: Subject to any disclaimer, the term of this patent is extended or adjusted under 35 U.S.C. 154(b) by 0 days.

(21) Appl. No.: 17/183,407

(22) Filed: Feb. 24, 2021

(65) Prior Publication Data

US 2021/0269699 A1     Sep. 2, 2021

Related U.S. Application Data

(60) Provisional application No. 62/982,199, filed on Feb. 27, 2020.

(51) Int. Cl.
| | | |
|---|---|---|
| *C09K 8/508* | (2006.01) | |
| *C08F 216/06* | (2006.01) | |
| *C08F 210/02* | (2006.01) | |
| *E21B 33/13* | (2006.01) | |
| *C09K 8/504* | (2006.01) | |

(52) U.S. Cl.
CPC .......... *C09K 8/5083* (2013.01); *C08F 210/02* (2013.01); *C08F 216/06* (2013.01); *C09K 8/5045* (2013.01); *E21B 33/13* (2013.01); *C08F 2810/50* (2013.01); *E21B 2200/08* (2020.05)

(58) Field of Classification Search
CPC .............. D06M 11/74; D06M 2200/30; C04B 24/2623; C04B 28/02; C04B 40/0039; C09K 8/46; C09K 8/487; C09K 8/5083; E21B 2200/08; E21B 33/13; E21B 33/138; E21B 33/14; E21B 43/261
See application file for complete search history.

(56) References Cited

FOREIGN PATENT DOCUMENTS

| CN | 1325921 A | * | 12/2001 | ......... C04B 20/1033 |
| WO | WO-2019131939 A1 | * | 7/2019 | .............. C08L 29/04 |

* cited by examiner

*Primary Examiner* — Zakiya W Bates
(74) *Attorney, Agent, or Firm* — Oblon, McClelland, Maier & Neustadt, L.L.P.

(57) ABSTRACT

A particulate compacted copolymer polyvinyl alcohol-based composition that can be used as a plugging agent for minimizing or eliminating loss of circulation of fluids during the process of well drilling, workover, completion and cementing in the production of oil and gas.

15 Claims, No Drawings

PARTICULATE PLUGGING AGENT BASED ON HYDROPHOBICALLY-MODIFIED VINYL ALCOHOL POLYMERS

CROSS-REFERENCE TO RELATED APPLICATIONS

This application claims priority under 35 U.S.C. § 119 from U.S. Provisional Application Ser. No. 62/982,199, filed 27 Feb. 2020, the disclosure of which is incorporated by reference herein for all purposes as if fully set forth.

This application is related to U.S. patent applications Ser. Nos. 16/554,078, 16/554,126, 16/554,177 and 16/554,231, all filed 28 Aug. 2019, Ser. No. 17/159,254, filed 27 Jan. 2021, and Ser. No. 17/160,445, filed 28 Jan. 2021, the disclosures of all of which are incorporated by reference herein for all purposes as if fully set forth.

FIELD OF THE INVENTION

This invention addresses the solubility performance of particulate, polyvinyl alcohol-based compositions, which can be used in manufacturing operations, but are also seeing frequent and growing use as plugging agents for minimizing or eliminating loss of circulation of fluids during the process of well drilling, workover, completion and cementing in the production of oil and gas. In particular, this invention relates to particulate, water-soluble polymer compositions containing vinyl alcohol copolymers, optionally blended with one or more specified additives and/or other polymers, wherein the compositions have a solubility performance that is modifiable in view of the polymeric properties and characteristics of the composition.

BACKGROUND OF THE INVENTION

Polyvinyl alcohol ("PVOH") is a widely known and versatile industrial material. It is routinely used for fabricating films, fibers and other shaped objects such as containers and devices for packaging, drug delivery and wound management. Perhaps more importantly, it is also experiencing growing use as a component in various compositions employed for the purpose of adjusting the permeability of a subterranean formation that is traversed by the borehole of a well drilled to enable the production of hydrocarbons.

Adjustments to the natural permeability of underground geologic formations are frequently employed by drilling and production interests either to direct the application of a displacing fluid precisely to one or more specific zones of an oil-bearing formation, or to reduce (or prevent) the loss to permeable and porous zones of the traversed formation of muds or other circulation fluids that are used throughout the wellbore to remove cuttings, counterbalance formation pressure and maintain hole stability. Compositions formed for injection or insertion into the subterranean geology traversed by a borehole are exposed to a variety of conditions, and polyvinyl alcohol is finding favor as a component of such compositions because its solubility in water and other solvents in the presence of the different types of environments found in the borehole can be modified.

In view of the great variety of uses to which polyvinyl alcohol is being devoted in systems and products designed for use in the subterranean treatment of hydrocarbon wellbores, polyvinyl alcohol compositions supplied for such use will desirably be made available that are characterized by a variety of different solubilities. Although the use of polyvinyl alcohol compositions in the context of subterranean wellbore treatment is generally discussed in the art, it appears that little attention has been given to the particular polymer characteristics that could be used specifically to provide PVOH compositions in a desirably large range of different solubilities.

For example, US2018/0187060A1 discloses using polyvinyl alcohol or ethylene/vinyl alcohol copolymer as a "water-soluble resin" in a composition to be used for treating subterranean wellbores where the composition contains numerous other components, most notably a reactive metal.

WO2006/088603A1 discloses the use of diverting agents coated with certain specified water-soluble materials including a collagen, poly(alkylene oxide), poly(lactic acid), polyvinyl alcohol and a polyvinyl acetate/polyvinyl alcohol polymer. Following completion of the treatment, the publication indicates that the diverting agent can be removed from the formation by dissolving the water-soluble coating.

WO2018/231236A1 and WO2019/031613A1 disclose diverting agents comprising polyvinyl alcohol. The publications indicate that the diverting agents have a unique solubility in warm water.

These references offer limited guidance concerning specific polymeric properties or characteristics, particularly solubility, that would be most desirable when selecting a vinyl alcohol-containing composition as a component in a wellbore treatment fluid.

It thus remains desirable to have particulate polyvinyl alcohol compositions, and processes and methods for providing them, wherein the compositions have improved utility and performance for use in downhole operations as plugging agents, such as diverting agents and/or lost circulation materials, as well as in use for other manufacturing purposes, which compositions are characterized by a modifiable solubility performance.

SUMMARY OF THE INVENTION

In view of the above-described need in the art to obtain and provide improved PVOH compositions for use in wellbore treatment fluids, it is proposed herein to provide such compositions that are characterized by a desirably broad range of solubilities and that may thus be more advantageously selected for use in specific downhole treatment situations than compositions having only uniform solubility performance. As it has been found that the degree of solubility of a vinyl alcohol containing composition has an inverse relationship to the hydrophobicity of the composition, which in turn has a direct relationship to the content of an olefinic (ethylenically unsaturated) comonomer in the composition, it is proposed that the compositions hereof be characterized in part by their content of one or more olefinic comonomers therein.

It is therefore proposed, in one aspect of this invention, to provide a plugging agent comprising particles of a compacted polyvinyl alcohol component, wherein that the polyvinyl alcohol component comprises a hydrolyzed copolymer of vinyl acetate and an olefinically unsaturated comonomer, wherein:

(a) the olefinically unsaturated comonomer is selected from the group consisting of ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, 2-butene, 4-methyl-1-pentene, ethyl-1-hexene, cyclohexene, norbornene, styrene, methyl styrene, allyl stearate, vinyl stearate, butadiene and mixtures thereof; and (b) the hydrolyzed copolymer has:
  (i) a content of the olefinically unsaturated comonomer in the range of at least about 2 mol %, and yet not more than about 10 mol %;
  (ii) a viscosity-average degree of polymerization in the range of at least about 200, and yet not more than about 5,000;
  (iii) a degree of hydrolysis in the range of at least about 70 mol %, and yet not more than 100 mol %;
  (iv) a degree of solubility in deionized water at a temperature in the range of from about 50° C. to about 70° C., of at least about 3 wt %, and yet not more than about 30 wt %;
  (v) a degree of solubility in deionized water at a temperature in the range of from about 90° C. to about 110° C., of at least about 75 wt %, and yet not more than about 100 wt %;
  (vi) a degree of crystallinity of at least about 0.2, and yet not more than about 0.55; and
  (vii) an olefinic unit block character of from about 0.90 to about 0.99.

In specific embodiments:
  (i) a content of the olefinically unsaturated comonomer is in the range of at least about 2 mol %, or at least about 3 mol %, or at least about 4 mol %, and yet not more than about 10 mol %, or not more than about 8 mol %, or not more than about 6 mol %;
  (ii) a viscosity-average degree of polymerization is in the range of at least about 200, or at least about 500, or at least about 1,500, and yet not more than about 5,000, or not more than about 3,750, or not more than about 2,250;
  (iii) a degree of hydrolysis is in the range of at least about 70 mol %, or at least about 75 mol %, or at least about 80 mol %, or at least about 85 mol %, and yet not more than 100 mol %, or not more than about 99 mol %, or not more than about 98%, or not more than about 95 mol %;
  (iv) a degree of solubility in deionized water at a temperature in the range of from about 50° C. to about 70° C., is at least about 3 wt %, or at least about 6 wt %, or at least about 12 wt %, and yet not more than about 30 wt %, or not more than about 25 wt %, or not more than about 20 wt %; and/or
  (v) a degree of solubility in deionized water at a temperature in the range of from about 90° C. to about 110° C., is at least about 75 wt %, or at least about 80 wt %, or at least about 85 wt %, and yet not more than about 100 wt %, or not more than about 99 wt %, or not more than about 98 wt %.

In another embodiment, the polyvinyl alcohol resin component is a mixture of two or more different polyvinyl alcohol resins.

In yet another embodiment, the polyvinyl alcohol resin component is a transition product as explained below.

The particulate plugging agents of the present invention are prepared by mixing the polyvinyl alcohol resin component and any optional additives, then compacting and granulating the resulting mixture. As the polyvinyl alcohol resin adheres to itself in the compaction and granulation process, no additional binder is needed to agglomerate the mixture. In other words, the specified polyvinyl alcohol component functions as the binder for the granule. Additives such as fillers, starches and plasticizers are added to the mixture as necessary. The plugging agent particles can be made using conventional compaction and granulation methods and equipment.

In yet another aspect of this invention, there is provided a method of reducing the loss of one or more desired fluids from a subsurface formation, or from a wellbore installed within such formation, comprising the step of applying the plugging agent of this invention to a wall of the formation or to an opening in a wall of the formation.

In yet another aspect of this invention, there is provided a method of reducing the intrusion of one or more undesired fluids into a wellbore installed within a subsurface formation, comprising the step of applying the plugging agent of this invention to a wall of the formation or to an opening in a wall of the formation.

The plugging agents of this invention are particularly suitable for use in subterranean formations wherein downhole temperatures can range up to about 200° F., although, in some cases, these compositions have suitable stability for sufficient time periods to be used at temperatures of up to about 250° F.

In another embodiment of the method, consequently, the plugging agent is temporary and subsequently removed by dissolution.

A particular advantage of the present plugging agents is that they are environmentally friendly since they are temporary, and are considered non-toxic and biodegradable.

These and other embodiments, features and advantages of this invention will be more readily understood by those of ordinary skill in the art from a reading of the following detailed description.

DETAILED DESCRIPTION

This invention relates to particulate polyvinyl alcohol compositions that have a solubility performance that is modifiable in view of the polymeric properties and characteristics of the composition, and find substantial use in downhole applications in subterranean treatments.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to. The use of "about" is intended to take into account some reasonable variance from the specific value that would ordinarily occur in industrial-scale or commercial-scale situations.

As used herein, the terms "comprises," "comprising," "includes," "including," "has," "having" or any other variation thereof, are intended to cover a non-exclusive inclusion. For example, a process, method, article, or apparatus that comprises a list of claim elements is not necessarily limited to only those elements but can include other elements not expressly listed or inherent to such process, method, article, or apparatus.

The transitional phrase "consisting of" excludes any claim element or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified claim elements, materials or steps and those others that do not materially affect the basic and novel characteristic(s) of the claimed invention. A "consisting essentially of" claim thus occupies a middle ground between closed claims that are written in a "consisting of" format, and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion", as used herein, unless otherwise defined herein, means that greater than 50% of the referenced material. If not specified, the percent is on a molar basis when reference is made to a molecule (such as hydrogen, methane, carbon dioxide, carbon monoxide and hydrogen sulfide), and otherwise is on a weight basis (such as for carbon content).

The term "substantial portion" or "substantially", as used herein, unless otherwise defined, means all or almost all or the vast majority, as would be understood by a person of ordinary skill in the relevant art in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising vinyl acetate and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

As ascertainable from the context, the term "composition" will typically be used to refer to more than one polymer and/or copolymer together, and optionally other types of components blended or admixed therewith, but can permissibly also be used to refer to just one polymer or copolymer by itself.

The term "unit" refers to a unit operation. When more than one "unit" is described as being present, those units are operated in a parallel fashion unless otherwise stated. A single "unit", however, may comprise more than one of the units in series, or in parallel, depending on the context. For example, a thermal treating unit may comprise a first cooling unit followed in series by a second cooling unit.

The term "free-flowing" particles (or agglomerates) as used herein means that the particles do not materially further agglomerate (for example, do not materially further aggregate, cake or clump), as is well understood by those of ordinary skill in the relevant art. Free-flowing particles need not be "dry" but, desirably, the moisture content of the particles is substantially internally contained so that there is minimal (or no) surface moisture.

The term "D(X) particle size" means the diameter at which X % of the sample's mass is comprised of particles with a diameter less than this value. For example, "D(10) particle size" means the diameter at which 10% of the sample's mass is comprised of particles with a diameter less than this value, and "D(90) particle size" means the diameter at which 90% of the sample's mass is comprised of particles with a diameter less than this value.

Mesh sizes of wire screens set forth herein for use in size classification operations are taken from the American Standard Sieve Series (Standard Specification for Woven Wire Test Sieve Cloth and Test Sieves) according to ASTM Standard E11 (2019 version). The sizes of the particles that make up a particulate composition, and thus the particle size distribution thereof, can be determined by processing the composition through a nested set of vibrating sieves, each sieve having a tray floor that is a different mesh size screen, and that is smaller than the screen immediately above it. After all material has fallen through the set of sieves and is either retained on a sieve or has fallen to the bottom collection pan, the weight fraction of the starting composition can be determined for each mesh size by weighing the amount of material that is retained on that screen having such mesh size, thus determining a size gradation for the particles of the composition. The mass of the sample on each sieve is then divided by the total mass to give a percentage of the total retained on each sieve, and which fraction is thus classified by the size of the mesh opening on that screen. In either case, a particle size distribution for the particular polyvinyl alcohol composition source or batch may thus be determined.

When the size of a particle herein is described, for example, as "X mesh size or larger", this means that the particle would not pass through the screen opening for that specifically named mesh size, not that mesh sizes tied to a larger number are also being in that particular instance referred to. Similarly, when the size of a particle herein is described, for example, as "smaller than X mesh size", this means that the particle would pass through the screen opening for that specifically named mesh size, not that mesh sizes tied to a smaller number are also being in that instance referred to.

The term "substantially soluble in water" and "soluble in water" means substantially completely (or completely) soluble in deionized water under the stated conditions.

The term "substantially soluble in brine" and "soluble in brine" means substantially completely (or completely) soluble in brine (i.e. a water solution with NaCl concentration of up to 2.9 wt %) under the stated conditions.

The term "acid-soluble weighting agent" means a material that is soluble in an acidic medium, or reacts in acidic medium to result in a product that is soluble in water. For example, calcium carbonate reacts in an acidic medium to generate calcium salt that is soluble in water.

For convenience, many elements of this invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

Polyvinyl Alcohol Copolymers

The polymers used in the manufacture of the compositions of this invention are vinyl alcohol based. The compositions hereof contain a copolymer having vinyl alcohol units together with units derived from one or more ethylenic comonomer, but can contain in addition polyvinyl alcohol homopolymers, or copolymers prepared from other monomers, as components in a polymer blend. Polyvinyl alcohol homopolymers and copolymers are both, in a general sense, well-known materials and are commercially available in many forms for a variety of end uses. Various types of representative polyvinyl alcohol homo- and copolymers are described, for example, in U.S. Pat. No. 4,119,604, as well as in previously incorporated U.S. patent applications Ser. Nos. 16/554,078, 16/554,126, 16/554,177 and 16/554,231, all filed 28 Aug. 2019, Ser. No. 17/159,254, filed 27 Jan. 2021, and Ser. No. 17/160,445, filed 28 Jan. 2021.

Polyvinyl alcohol is produced on a commercial scale by polymerizing a vinyl ester and comonomers to generate a polyvinyl ester, after which the ester groups are hydrolyzed to hydroxyl groups in varying degrees. Examples of vinyl esters suitable for use herein as a starting material include vinyl acetate, vinyl propionate, vinyl benzoate, vinyl stearate, vinyl versatate, vinyl pivalate, vinyl formate, vinyl valerate, vinyl caprinate, vinyl laurate, and vinyl carboxylate copolymers, such as ethylene-vinyl acetate copolymer. For reasons of economy, availability and performance, vinyl acetate is preferred. Several different hydrolysis methods, as described below, are well-known and can be used for the purpose of completing the conversion to —OH groups of the pendant ester groups in the polymer formed from whatever vinyl ester is chosen as the beginning reactant.

A polyvinyl acetate intermediate, which is the most frequent choice, can be produced by the free radical polymerization of a vinyl acetate monomer and comonomers in the presence of a polymerization catalyst. The solvent commonly used in the commercial polymerization of vinyl acetate is a hydrolytic alcohol such as methanol, ethanol, the propanols or the monomethyl ether of ethylene glycol. Methanol is preferred. The polymerization is typically conducted in the temperature range of from about 10° C. to about 80° C. The lower end of the polymerization range is known to give products with improved properties. The percent conversion of vinyl acetate to polyvinyl acetate can vary over a wide range. Though conversions ranging from about 20% to 100% have been found satisfactory, commercially at least about 30% conversion is preferable.

When a vinyl alcohol copolymer is prepared, one or more comonomers is included in the reaction by which the beginning vinyl ester reactant is polymerized. Without the presence of the comonomers, a PVOH homopolymer would be obtained. The comonomer(s) provided along with the beginning vinyl ester are incorporated into the polymer chain, and remain intact after hydrolysis of the pendant ester groups to —OH groups. The compositions hereof are based on the presence therein of such a copolymer having hydrophobic properties, and the additional monomer(s) incorporated along with the beginning vinyl ester reactant in such hydrophobic copolymers are olefinic monomer(s). Olefinic monomers are typically defined as including unsaturated hydrocarbons that contain one or more double or triple bonds, and are sometimes alternatively referred to as ethylenic or ethylenically unsaturated monomers. Moreover, as the purpose, however, of the presence of the olefinic comonomer(s) in the vinyl alcohol copolymers of this invention is to impart a degree of hydrophobicity to the vinyl alcohol copolymer, unsaturated monomers containing atoms other than hydrogen and carbon but that nevertheless impart hydrophobicity will also be included in the term "olefinic monomer" as used herein.

Particular examples of suitable olefinic comonomers for use herein (whether straight chain, cyclic, aromatic, or optionally branched) include without limitation ethylene, propylene, $C_4$-$C_{20}$ α-olefins, $C_4$-$C_{20}$ internal olefins, $C_4$-$C_{20}$ vinylidene olefins, $C_5$-$C_{20}$ cyclic olefins, $C_8$-$C_{20}$ aromatic olefins, and $C_4$-$C_{20}$ dienes, as well as $C_4$-$C_{20}$ functionalized olefins, including derivatives of any of the foregoing containing hetero atoms such as O, S or N. Any of the $C_4$-$C_{20}$ compounds listed in the preceding sentence may instead be a $C_4$-$C_{12}$ or a $C_4$-$C_8$ compound as desired. Examples of suitable olefinic monomers include without limitation ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, 2-butene, 4-methyl-1-pentene, ethyl-1-hexene, cyclohexene, norbornene, styrene, methyl styrene, allyl stearate, vinyl stearate, butadiene, mixtures thereof and the like. Preferred are ethylene in combination with a $C_3$-$C_8$ α-olefin; more preferred is ethylene. In addition, combinations of an acid-functional comonomer and an olefinic comonomer can also be used.

As noted above, other types of monomers containing hetero atoms are available for use when desired to impart hydrophobicity to a vinyl alcohol polymer, particularly when in admixture with a true hydrocarbon such as ethylene. Examples of such other types of monomers include acrylics, amides and imides, carbonates, esters, ethers, fluorocarbons, vinyl acetals, vinyl and vinylidene chlorides, vinyl esters, vinyl ethers and ketones, propylene oxide, vinylpyridine and vinypyrrolidone.

In yet another embodiment, various "acid functional" comonomers are available for use as comonomers in a PVOH copolymer. Many of these copolymers will exhibit hydrophobicity, or they can be blended with a hydrophobic PVOH if they are found to not possess hydrophobicity themselves to the desired extent. Such acid-functional comonomers include, for example, one or more of (i) a monocarboxylic unsaturated acid, (ii) a dicarboxylic unsaturated acid, (iii) an alkyl ester of (i), (iv) an alkyl ester of (ii), (v) an alkali metal salt of (i), (vi) an alkali metal salt of (ii), (vii) an alkaline earth metal salt of (i), (viii) an alkaline earth metal salt of (ii), (ix) an anhydride of (i), and (x) an anhydride of (ii).

Particular examples of such acid-functional comonomers include methacrylic acid, methyl methacrylate, 2-hydroxyethyl acrylate, hydroxyl methacrylate, ethyl methacrylate, n-butyl methacrylate, maleic acid, monomethyl maleate, dimethyl maleate, maleic anhydride, itaconic acid, monomethyl itaconate, dimethyl itaconate, itaconic anhydride, neodecanoic acid, and vinyl neodecanoate. Preferred are lower alkyl ($C_2$-$C_8$, or $C_2$-$C_4$) acrylates and methacrylates. Non-limiting examples of such comonomers include methyl acrylate, methyl methacrylate, ethyl acrylate, ethyl methyacrylate, i-propyl acrylate, i-propyl methacrylate, n-propyl acrylate, n-propyl methacrylate, i-butyl acrylate, i-butyl methacrylate, n-butyl acrylate, n-butyl methacrylate, t-butyl acrylate, t-butyl methacrylate, ethylhexyl acrylate, ethylhexyl methacrylate and others. Preferred comonomers also include methyl acrylate, methyl methacylate and mixtures thereof, and particularly methyl acrylate.

The content of a comonomer in a polyvinyl ester (such as a polyvinyl acetate), and thus in the resulting polyvinyl alcohol copolymer prepared therefrom, can be at least about 0.1 mol %, or at least about 0.5 mol %, or at least about 1 mol %, and yet not more than about 15 mol %, or not more than about 10 mol %, or not more than about 8 mol %. A hydrophobic copolymer prepared according to this invention can have a weight average molecular weight in the range of at least about 3,000, or at least about 20,000, or at least about 50,000, and yet not more than about 180,000, or not more than about 130,000, or not more than about 80,000.

In an alternative embodiment involving the particular case of a hydrocarbon olefinic comonomer, however, the content of a hydrocarbon olefinic comonomer in a polyvinyl ester, such as a polyvinyl acetate (and thus in the resulting hydrophobic polyvinyl alcohol copolymer hereof), can be at least about 2 mol %, or at least about 3 mol %, or at least about 4 mol %, and yet not more than about 10 mol %, or not more than about 8 mol %, or not more than about 6 mol %. Examples of commercially available polyvinyl alcohols containing an olefinic comonomer that could be used in line with the invention set forth herein include those available under the trade designation EXCEVAL™ RS2117 copolymer (Kuraray America, Inc., Houston, Tex. USA). By contrast, while nomenclature is not necessarily always dispositive, many products available commercially in the category of "ethylene/vinyl alcohol" copolymer frequently contain an olefinic comonomer therein in an amount of at least about 20 mol %, or at least about 30 mol %, or at least about 40 mol %.

The viscosity-average degree of polymerization of a polyvinyl ester (such as a polyvinyl acetate), and thus of the resulting polyvinyl alcohol prepared therefrom, can be in the range of at least about 200, or at least about 500, or at least about 1,500, and yet not more than about 5,000, or not more than about 3,750, or not more than about 2,250. The viscosity-average degree of polymerization of a polyvinyl alcohol polymer is measured in accordance with HS K6726 (1994), as described herein.

Preferred amount of conversion of a polyvinyl ester (e.g. polyvinyl acetate) intermediate material to PVOH is measured as a degree of hydrolysis. The polyvinyl alcohol resins hereof can have a degree of hydrolysis in the range of at least about 70 mol %, or at least about 75 mol %, or at least about 80 mol %, or at least about 85 mol %, and yet not more than 100 mol %, or not more than about 99 mol %, or not more than about 98%, or not more than about 95 mol %. The degree of hydrolysis can be measured in accordance with HS K6726 (1994).

The polyvinyl alcohol resins hereof (a) can have a degree of solubility in deionized water at a temperature in the range of about 50° C. to about 70° C. of at least about 3 wt %, or at least about 6 wt %, or at least about 12 wt %, and yet not more than about 30 wt %, or not more than about 25 wt %, or not more than about 20 wt %; and (b) can have a degree of solubility in deionized water at a temperature in the range of about 90° C. to about 110° C. of at least about 75 wt %, or at least about 80 wt %, or at least about 85 wt %, and yet not more than about 100 wt %, or not more than about 99 wt %, or not more than about 98 wt %. Degree of solubility for the above is measured after 300 minutes at the specified temperature as set forth in the Examples.

The polyvinyl alcohol resins hereof can have a degree of crystallinity of at least about 0.2, or at least about 0.25, or at least about 0.35, and yet not more than about 0.55, or not more than about 0.5, or not more than about 0.4. For the above numbers, degree of crystallinity is measured according to known differential scanning calorimetry (DSC) techniques, which is a method of measuring the flow of heat into or out of a material with respect to time or temperature, and can be measured by quantifying the heat associated with melting (fusion) of the polymer. The heat can be evaluated in terms of percent crystallinity by ratioing against a polymer of known crystallinity to obtain relative values, or by ratioing against the heat of fusion for a 100% crystalline polymer sample. DSC is frequently performed with a thermoelectric disk with raised platforms over which the reference (usually an empty pan) and a metal pan carrying a sample are placed. As heat is transferred through the disk, the differential heat flow to the sample and reference is monitored by area thermocouples. The sample temperature can be directly monitored by a sample thermocouple. The presence of a preheated purge gas further provides additional baseline stability in addition to the desired sample/atmosphere interaction. However, polymer crystallinity can also be measured using dilatometry, x-ray scattering, or polarized optical microscopy with similar results.

The polyvinyl alcohol resins hereof can have an olefinic unit block character of about 0.90 to about 0.99, which indicates non-blockiness, i.e. substantial randomness. Unit block character, or the blockiness index, of a polymer is calculated from the triad distribution, using the analysis outlined in Halverson, F. et al, *Macromolecules* 18 (6), 1985, 1139-1144. Results obtained according to this approach are usually categorized as follows: 100% block copolymers have a blockiness index value of about 0.0; 100% alternating copolymers have a blockiness index value of about 2.0; and ideally random copolymers have a blockiness index value of about 1.0.

Preferred viscosity of the PVOH resins hereof, based on a solution of 4 wt % in water (20° C., DIN 53015), is in the range of from about 2 mPa·s, or from about 3 mPa·s, or from about 10 mPa·s, to about 125 mPa·s, or to about 70 mPa·s, or to about 40 mPa·s, or to about 30 mPa·s, or to about 15 mPa·s. The viscosity of a polyvinyl alcohol resin hereof can be determined on a 4% aqueous solution at 20° C. determined by the Hoeppler falling ball method (ASTM-D 1343-56).

The PVOH resins hereof generally have an average density from about 0.9 g/mL or greater, or about 1 g/mL or greater, or about 1.1 g/mL or greater, or about 1.2 g/mL or greater, about 1.3 g/mL or greater, or about 1.4 g/mL or greater, or about 1.5 g/mL or greater.

The PVOH resins hereof generally have a bulk density of at least about 0.3 g/cm$^3$, at least about 0.4 g/cm$^3$, at least about 0.5 g/cm$^3$, or at least about 0.6 g/cm$^3$. In one embodiment, the bulk density is no more than about 0.8 g/cm$^3$, or no more than about 0.6 g/cm$^3$, or no more than about 0.5 g/cm$^3$. In one embodiment, after compaction, the particles of the present invention should have a bulk density of about 0.9 g/mL or greater, or about 0.95 g/mL or greater, or about 1 g/mL or greater, or about 1.1 g/mL or greater, or about 1.2 g/mL or greater, about 1.3 g/mL or greater, or about 1.4 g/mL or greater, or about 1.5 g/mL or greater. In one embodiment, the upper limit of bulk density is about 1.5 g/ml. Bulk density is measured according to ASTM D1895C-17.

As a result, in one embodiment, there is provided herein a particulate vinyl alcohol copolymer that comprises (a) vinyl alcohol monomers, and (b) olefinically unsaturated monomers, and wherein the copolymer is characterized by:

(i) a content of the olefinically unsaturated comonomer in the range of at least about 2 mol %, or at least about 3 mol %, or at least about 4 mol %, and yet not more than about 10 mol %, or not more than about 8 mol %, or not more than about 6 mol %;

(ii) a viscosity-average degree of polymerization in the range of at least about 200, or at least about 500, or at least about 1,500, and yet not more than about 5,000, or not more than about 3,750, or not more than about 2,250;

(iii) a degree of hydrolysis in the range of at least about 70 mol %, or at least about 75 mol %, or at least about 80 mol %, or at least about 85 mol %, and yet not more than 100 mol %, or not more than about 99 mol %, or not more than about 98%, or not more than about 95 mol %;

(iv) a degree of solubility in deionized water at a temperature in the range of about 50 to about 70C of at least about 3 wt %, or at least about 6 wt %, or at least about 12 wt %, and yet not more than about 30 wt %, or not more than about 25 wt %, or not more than about 20 wt %; and (v) a degree of solubility in deionized water at a temperature in the range of about 90 to about 110C of at least about 75 wt %, or at least about 80 wt %, or at least about 85 wt %, and yet not more than about 100 wt %, or not more than about 99 wt %, or not more than about 98 wt %.

In another embodiment, the above-described copolymer can have in addition a degree of crystallinity of at least about 0.2, or at least about 0.25, or at least about 0.35, and yet not more than about 0.55, or not more than about 0.5, or not more than about 0.4.

In another embodiment, the above-described copolymer can have in addition an olefinic unit block character of about 0.90 to about 0.99.

Blends With Other Polyvinyl Alcohols

A vinyl alcohol copolymer that contains an ethylenic comonomer, as utilized herein, can in an alternative embodiment be blended with a different kind of vinyl alcohol polymer to form a blended polymer composition. Such different kind of PVOH can be a PVOH homopolymer; or can be a second PVOH copolymer having a comonomer that is not an ethylenic monomer, or a second PVOH copolymer that has a different type of ethylenic comonomer but is characterized by a different set of properties and attributes resulting in a different degree of hydrophobicity than the first PVOH copolymer. Differing degrees of hydrophobicity between first and second PVOH copolymers in a blend will impart a different degree of solubility to the blend itself than either of the component copolymers would have individually. A hydrophobic copolymer can be present in a polymer blend in an amount of about 10 wt % to about 90 wt %, or an amount of about 20 wt % to about 80 wt %, or an amount of about 30 wt % to about 70 wt %, or an amount of about 40 wt % to about 60 wt %.

Polymer blending thus offers significant and extended opportunities for tailoring the solubility of a blend of two or more of the variety of PVOH copolymers provided herein to a selected, particularly desirable value. Content and identity of an ethylenic comonomer, degree of polymerization, and degree of hydrolysis are all polymer characteristics that can be modified in concert to produce a PVOH copolymer, and composition thereof, having a solubility tailored to a selected, particularly desirable value. Of these, content and identity of an ethylenic comonomer have received little to no appreciation by the art for the role they can play in modifying polymeric and compositional solubility, as discussed below.

In one embodiment, a polyvinyl alcohol composition hereof comprises a blend of polymeric components, wherein each component can be present in the blend in an amount of at least about 10 wt %, or at least about 25 wt %, or at least about 40 wt %, and yet less than about 85 wt %, or less than about 70 wt %, or less than about 55 wt %, based on the total weight of all polyvinyl alcohol components, and wherein the content of all polymeric components totals to 100 wt %.

Other polyvinyl alcohols suitable for blending include those disclosed in previously incorporated U.S. patent applications Ser. Nos. 16/554,078, 16/554,126, 16/554,177 and 16/554,231, all filed 28 Aug. 2019, Ser. No. 17/159,254, filed 27 Jan. 2021, and Ser. No. 17/160,445, filed 28 Jan. 2021.

Transition Grade Blends ("Transition Products")

In another embodiment hereof, a polyvinyl alcohol composition hereof can be a transition product produced in a continuous hydrolysis process. Such a transition product is in essence an intimate reactor blend of multiple polyvinyl alcohol grades as would be recognized by one of ordinary skill in the relevant art.

For example, in many commercial continuous polyvinyl alcohol hydrolysis processes, instead of completely stopping the process and cleaning the equipment, the polyvinyl acetate feed is transitioned and/or the reaction conditions are transitioned from grade to grade. At some point, the process, which has been producing one grade of specified properties, transitions over time to a second grade of specified properties by stopping production of the first product and starting production of the second. The production from this interim time period is referred to as a transition grade.

In one embodiment, this transition grade is produced by transitioning production of a polyvinyl alcohol copolymer to production of a polyvinyl alcohol homopolymer (or vice versa). In this case, the polyvinyl alcohol homopolymer is less soluble than the polyvinyl alcohol copolymer so that the dissolution rate of the particulate composition can be modified.

In another embodiment, the transition grade is produced by altering the hydrolysis conditions, for example, thermal treatment step and/or level of excess catalyst neutralization, which can result in different solubility polyvinyl alcohols from the same starting polyvinyl acetate.

In another embodiment, the transition grade is produced by transitioning both the starting polyvinyl acetate and the hydrolysis conditions (for example, thermal treatment step and/or level of excess catalyst neutralization).

While the exact composition of the transition grade varies as a function of time, when different polyvinyl starting materials are used the average composition typically falls within the blend proportions as described above.

Polyvinyl Alcohol Reaction Products

Also included in the polyvinyl alcohol composition to which this invention applies are compositions in which one or more —OH groups on a polymer chain has participated in a reaction to form a derivatized polymer. For example, the —OH groups can form inorganic esters such as when they react with boric acid, borates, lactates, sulfates, vanadyl compounds and/or substituted derivatives thereof, and mixtures of any two or more of the foregoing. Polyvinyl alcohol can also undergo Michaels addition with compounds containing activated double bonds, including for example acrylonitrile, acrylamide and vinyl aldehydes and ketones, including in each case substituted derivatives of, and mixtures of, the named reactants.

In other embodiments, the —OH group of a polyvinyl alcohol can form organic compounds such as the formation of an ester from a carboxylic acid or anhydride (e.g. acrylic or methacrylic acid, or maleic anhydride); the formation of a carbonate from a chloroformate; and the formation of a carbamate from a urea or isocyanate; including in each case substituted derivatives of, and mixtures of, the named reactants. Polyvinyl alcohol can also form an internal ether from the elimination of water, and can form an external ether from a reaction with a $C_2$ or higher, chloro-substituted carboxylic acid or ester thereof, including in each case substituted derivatives of, and mixtures of, the named reactants. Polyvinyl alcohols can also be crosslinked in a reaction with a multifunctional compound such as glyoxal, glutaraldehyde, urea-formaldehyde, melamine-formaldehyde, trimethylolmelamine sodium borate or boric acid, and isocyanates.

Polymer Production

A polyvinyl ester such as a polyvinyl acetate is converted to polyvinyl alcohol via hydrolysis, or alcoholysis, processes, as well known in the art. In such processes, the polyvinyl acetate is contacted with an alkali catalyst such as sodium hydroxide or sodium methylate. The major products of this reaction are polyvinyl alcohol and methyl acetate. Regardless of the hydrolysis process, the resulting polyvinyl alcohols would be expected to have substantially the same monomer makeup and degree of polymerization as the starting polyvinyl acetates.

In one embodiment of this invention, a polyvinyl alcohol can be prepared by a bulk, solution, suspension, dispersion or emulsion process. In such processes, a polyvinyl alcohol in a gel-like form, which is resistant to dissolving (or "sliming") in water, can be prepared by vigorously mixing alcoholic solutions of a polyvinyl ester and alkali in a mixing chamber such as a tank reactor. The PVOH product is removed from the reactor intact for further processing during which it continues to undergo gelation.

Generally in this type of process, polyvinyl acetate dissolved in methanol is treated with a strongly basic catalyst such as sodium methoxide, and methanolysis commences immediately forming vinyl alcohol units in the polymer and methyl acetate as a byproduct. In general, the alcoholysis reaction will be effected with the hydrolytic alcohol at temperatures ranging from about 20° C., or from about 40° C., to about 100° C., or to about 65° C., and the alcohol is most typically methanol, as noted, but can be other lower alkanols such as ethanol if desired. The pressure should, of course, be sufficient to maintain liquid-phase conditions at the desired temperature for the reaction, and pressures from atmospheric to two or more atmospheres of pressure or higher can be used. The hydrolytic alcohol should be substantially anhydrous, by which is meant that the alcohol will contain not more than about 1 percent, and preferably not more than about 0.2 percent water.

The alcohol content of the alcoholysis mixture should be such as to provide a suitable excess of the alcohol. Most generally, the alcohol used will be the alcohol employed for dissolving the ester in the production of the intermediate vinyl ester polymer which is to be alcoholyzed. It will generally constitute from around 40 to 90 percent, preferably 50 to 70 percent, of the weight of the alcoholysis reaction mixture. Conversely, the solids content will generally be 10 to 60 percent, preferably 30 to 50 percent, of the reaction mixture. The by-product of the alcoholysis reaction will be methyl acetate. Such ester can be removed as formed during the alcoholysis or allowed to build up in the alcoholysis medium.

The alcoholysis catalyst can be any of the alkaline catalysts that are effective in catalyzing the alcoholysis such as the alkali metal hydroxides and the alkali metal alcoholates. The alcoholate catalysts, particularly sodium methylate, are especially preferred. The catalyst concentration in the alcoholysis mixture may range from around 0.05 to 5 percent by weight, but preferably will be about 0.1 to 1 percent, of the weight of the alcoholysis mixture.

Instead of a tank reactor as mentioned above, other types of reactors may also be used when preparing a reaction mixture that will be deposited in, on or onto a receptacle (as described below), including without limitation a line mixer, a kneader type mixer, a piston-flow type reactor, a tube type reactor, and a tower type reactor. Examples of suitable tower type reactors include packed towers, perforated plate towers, and plate towers, such as bubble-cap towers. Alternatively, a heat-exchanging type reactor may be suitable for use herein, examples thereof including falling film evaporators, such as plate-fin type evaporators, wetted-wall towers, thin film evaporators, and shell and tube evaporators.

Regardless of the type of reaction device used, little to no change in the appearance of the solution is observed; during the initial portion of this type of reaction. However, as the degree of alcoholysis approaches 40 to 50 percent, the viscosity begins to rise rapidly, and the solution gels. Heavy-duty mixing equipment would ordinarily be required to maintain good mixing, and then, as the alcoholysis proceeds further, to break down the gel into discrete particles. In this type of process, however, continuous processing of a so-called "plug flow" nature is employed such that all increments of the total mixture have essentially the same holdup time, or residence time, in the alcoholysis reaction zone because, as gelation ensues, the reaction mixture is spread out quickly as a film on a moving belt or rotating drum. The reaction mixture deposited in, on or onto the receptacle or carrier forms a body undergoing gelation, and at the point before a significant amount of syneresis has taken place, the body is removed from the belt or drum, and is passed into a granulator, or other apparatus for cutting, comminuting or chopping the gel in any required manner.

Granulating a body undergoing gelation that is formed from a polyvinyl alcohol (co)polymer, or blend thereof with other polymers, provides PVOH granules that are relatively compact and regular in shape. Using a knife or other suitable cutting device, the body may be granulated wherein the granulator can be adjusted to provide a batch of granules at least about 90 wt %, or at least about 95 wt %, or at least about 98 wt %, or at least about 99 wt % of which have a size that is 35 mesh or larger, or 25 mesh or larger, or 18 mesh or larger, or 14 mesh or larger.

In other embodiments, the granulator can be adjusted to provide a batch of granules at least about 90 wt %, or at least about 95 wt %, or at least about 98 wt %, or at least about 99 wt % of which have a size and shape wherein such granules fit within the volume defined by a right cuboid (a rectangular cuboid) having a length that is at least about 2 mm or more, or at least about 3 mm or more, or at least about 4 mm or more, and yet is about 10 mm or less, or about 8 mm or less, or about 6 mm or less; a width that is at least about 1 mm or more, or at least about 2 mm or more, or at least about 3 mm or more, and yet is about 8 mm or less, or about 7 mm or less, or about 6 mm or less; and a height that is at least about 0.5 mm or more, or at least about 0.75 mm or more, or at least about 1 mm or more, and yet is about 2 mm or less, or about 1.5 mm or less, or about 1.25 mm or less. A right cuboid (a rectangular cuboid) in this context is one in which each of the faces is a rectangle and so each pair of adjacent faces meets in a right angle. In the above description of dimensions, the cuboid is considered as being viewed from above where the length is the longest dimension, the height is the shortest dimension, and the value of the width is between the values of the other two dimensions. In the view of the cuboid from above, the length and width form a rectangle, and the height dimension is perpendicular to the plane of the rectangle formed by the length and width, and represents the depth or thickness of such rectangle.

If desired, the granules obtained by granulating a body undergoing gelation can be dried to reduce the content of a monohydric alcohol therein to less than about 5 wt %, or less than about 3 wt %, or less than about 2 wt %, or less than about 1 wt %, or less than about 0.5 wt %. For such purpose, contact dryers, shovel dryers, disk dryers and fluidized bed dryers are all suitable as apparatus in which thermal drying can be carried out. Suitable commercial brands of dryers include for example Bepex® dryers and Nara® dryers. Drying can also take place in the granulator itself, by heating the shell or blowing warm air into it. It is similarly possible to use a downstream dryer, for example a tray dryer, a rotary tube oven, a centrifuge, or a heatable screw. Preferred drying temperatures range from about 50° to about 250° C., or to about 200° C., or to about 150° C. The preferred residence time at such a temperature is less than 30 minutes and more preferably less than 10 minutes. However, drying will frequently leave at least a trace or negligible amount of monohydric alcohol in the polymer.

Processes for making polyvinyl alcohol granules from a body undergoing gelation are more fully described in previously incorporated U.S. patent application Ser. No. 16/554,231 (filed 28 Aug. 2019).

Another process for obtaining vinyl alcohol polymers is the slurry process. In a slurry alcoholysis process, which is desirably a continuous process, polyvinyl alcohol is obtained from polyvinyl acetate and recovered as a slurry in a methanol and methyl acetate solvent system. The alcoholysis unit contains an agitation means so that the alcoholysis is at least partially conducted under agitation conditions. When the alcoholysis reaches about 40-50%, the polymer partially precipitates. The insoluble material takes the form of a gel of polymer molecules solvated with methanol. As the solubility decreases by further alcoholysis, the gel becomes tougher and begins to reject the associated solvent molecules. When the alcoholysis is completed, the polymer and solvent are mutually insoluble. If this gel is allowed to stand undisturbed, alcoholysis proceeds and the product is obtained in a massive, unworkable form. However, if the gel is worked mechanically (agitated) during this range above about 40% alcoholysis, the polymer will break down to finely-divided solids insoluble in the alcohol. The collapsing gel traps and sticks together with the fine particles from the previous alcoholysis cycle producing polyvinyl alcohol in a well understood "popcorn ball" morphology. The slurry alcoholysis process is more fully described in US2017/0260309A1, US2019/0055326A1, U.S. Pat. Nos. 2,734,048, 3,497,487 and 3,654,247.

In yet another embodiment, a polyvinyl alcohol may be prepared in a single or twin screw extruder by the alcoholysis of a polyvinyl ester in the presence of a basic catalyst and in the presence of an alkanol as solvent. This process involves first dissolving, in the extruder, a polyvinyl ester having a degree of polymerization of from 400 to 10,000 (determined from the weight average of the molecular weight) in a lower alkanol, the alkanol being employed in an amount of from about 10 wt % to about 50 wt % (relative to the polyvinyl ester); then mixing the resulting solution at a temperature of from about 30° C. to about 60° C. with a solution of the catalyst in a lower alkanol, so as to form a homogeneous mixture; then warming the mixture to a temperature of from about 70° C. to about 150° C.; and, finally, cooling the resulting polyvinyl alcohol to a temperature of from about 20° C. to about 40° C. and neutralizing, washing and drying it in a customary manner.

The starting material used for this process is a polyvinyl ester such as polyvinyl acetate wherein the degree of polymerization of the polyvinyl ester (determined from the weight average of the molecular weight) is in the range from 400, or from 500, to 10,000, or to 6,000. The alcoholysis of the polyvinyl ester is carried out in the presence of a lower alkanol, preferably an alkanol having 1, 2 or 3 carbon atoms, such as methanol, ethanol, propanol and isopropanol. The alkanol is used in an amount of from about 10 wt %, or from about 20 wt %, to about 50 wt %, or to about 40 wt % (relative to the polyvinyl ester). This alcoholysis process is carried out in the presence of a basic catalyst such as an alkali metal hydroxide or alkali metal alcoholate as the catalyst including, for example, sodium hydroxide, potassium hydroxide, sodium methylate, ethylate and propylate as well as potassium methylate, ethylate and propylate. The amount of the catalyst is usually from about 1 wt %, or from about 6 wt %, to about 10 wt %, or to about 9 wt % (relative to the polyvinyl ester). The concentration of the catalyst solution is appropriately within the range from about 10 wt %, or from about 12 wt %, to about 25 wt %, or to about 20 wt %.

Depending on the type and quantity of the polyvinyl ester, a period of from about 1 to about 5 minutes is required for the trans-esterification reaction. Finally, the polyvinyl alcohol obtained after the trans-esterification reaction is cooled to a temperature of from about 20° C. to about 40° C., and is neutralized, washed and dried in the customary manner. The neutralization can be effected by means of a weak inorganic, or preferably organic, acid, for example phosphoric acid or acetic acid. After being neutralized, the polyvinyl alcohol is washed with a lower alkanol of the type mentioned above. The final drying is carried out at a temperature of from about 70° C. to about 175° C., preferably under an inert gas, for example nitrogen. The polyvinyl alcohol product is obtained in the form of a crumbly particulate material which is distinguished by good flow properties. The average particle diameter of the PVOH product of obtained in this manner is within the range from about 0.1 mm, or from about 0.3 mm, to about 1.5 mm, or to about 0.8 mm.

Instead of removing the PVOH product from the extruder for washing and drying, however, a plasticizer can be injected to a downstream zone of the extruder, which permits the product to behave as a thermoplastic as it passes through that zone and enables it to be extruded as a strand that can be pellitized. Since PVOH in the unplasticized state has a high degree of crystallinity and shows little or no thermoplasticity before the occurrence of decomposition which starts at about 170° C. (and becomes pronounced at 200° C.), the use of a plasticizer is essential if there is a desire to obtain the PVOH product in the form of a pelletized strand. The same effect can be achieved by removing the product from the reaction extruder and passing it to a second extruder together with a plasticizer for pellitization, and this permits the added option of washing and drying before feeding to the second extruder.

Typical plasticizers are low-molecular-weight organic substances which have relatively high polarity. This polar and hydrophilic structure is needed to achieve maximum compatibility with the polyvinyl alcohol structure, which is likewise highly polar and hydrophilic. Suitable plasticizers include polyhydric alcohols, e.g. glycerine, diglycerine, sorbitol, ethylene glycol, diethylene glycol, polyethylene glycol, pentaerythritol, dipentaerythritol, propylene glycol, trimethylolpropane, di-trimethylolpropane, and triethanolamine. Typically the level of the plasticizer when used for this purpose can vary from about 2 wt % to about 30 wt %, or to about 20 wt %, or to about 10 wt %, based on the total weight of the polyvinyl alcohol composition.

The pellets can be made into any desired shaped depending on the extrusion die (cylindrical, oval, rectangular, star etc.), but typically they are substantially cylindrical in shape. The preferred length of the pellets is from about 2 mm, or from about 3 mm, to about 5 mm, or to about 4 mm. The diameter of the pellets is from about 1.2 mm, or from about 2 mm, to about 5 mm, or to about 4 mm. If the pellet is not cylindrical, then the diameter should be taken as the widest part of the pellet. These dimensions have been found as particularly suitable for balancing plugging effectiveness versus water solubility and speed of plug disintegration when a PVOH composition of this invention is used for downhole treatments of a subterranean wellbore. A composition of this invention when used for such purpose will preferable contain a D(90) pellet size within the above dimensions.

The use of extruders in processes for making vinyl alcohol polymers is further discussed in references such as U.S. Pat. Nos. 4,338,405 and 4,401,790.

Additives

A composition of this invention may also optionally include one or more additives, which additives may include, for example, fillers (such as acid-soluble weighting agents), plasticizers (as mentioned above), monovalent metallic salts, starches, slip additives, antioxidants, pigments, dyes, metal ion chelators as well as mixtures thereof.

For example, fillers may be blended with the resin component to enhance mechanical properties and regulate the solubility curves of the compositions of this invention. The total amount of filler added (including acid-soluble weighting agent) can vary widely depending on the desired property modification, for example, up to about 50 wt %, or up to about 30 wt %, or up to about 5 wt %, based on the total weight of the compositions.

In many instances where a composition hereof is being used for downhole treatments, it is desirable to have the specific gravity of the composition be close to that of a carrier fluid in order to allow for pumping and satisfactory placement of a diverting agent or loss circulation control compositions using the selected carrier fluid. A weighting agent can be used for such purpose.

When used, an acid-soluble weighting agent filler can be blended with the resin prior to compaction. Weighting agent generally refers to any additive used to increase the density of the resin component. Acid-soluble weighting agents generally include substances such as natural minerals and inorganic and organic salts. For example, the weighting agent can comprise a metal ion selected from the group consisting of calcium, magnesium, silica, barium, copper, zinc, manganese and mixtures thereof, and a counterion is selected from the group consisting of fluoride, chloride, bromide, carbonate, hydroxide, formate, acetate, nitrate, sulfate, phosphate and mixtures thereof.

In another embodiment, the filler added is an acid-soluble weighting agent, which generally include substances such as natural minerals and inorganic and organic salts. Specific examples of such fillers include minerals such as $CaCO_3$, $CaCl_2$ and $ZnO$.

In yet another embodiment, this invention provides a composition suitable for use in downhole treatments that includes a blend of a polyvinyl alcohol resin component and an acid-soluble weighting agent with a starch. Such blend can typically comprise from about 10 to about 90 parts by weight of the polyvinyl alcohol resin component and from about 90 to about 10 parts by weight of a starch, based on 100 parts by weight of the combination of polyvinyl alcohol resin component and starch. Preferably, however, there should be at least about 30 parts by weight polyvinyl alcohol resin component in any starch blend. Suitable starches for use in the present invention include natural starches, synthetic starches, physically modified starches, chemically modified starches and mixtures thereof.

Plasticizers may be included in manufacturing of the compositions of this invention to improve the flow characteristics of the polyvinyl alcohol, as noted above. When it is desired to utilize a plasticizer as a coating, in order to obtain uniform application of the plasticizer it is preferred to utilize a spray mechanism to coat the particles of the polyvinyl alcohol component(s) of the composition. A secondary effect of such plasticizers is to reduce any dusting issues with the polyvinyl alcohol compositions prepared therefrom.

Materials commonly used as plasticizers for polyvinyl alcohols are generally known to those of ordinary skill in the relevant art, and are generally commercially available. Suitable plasticizers include, for example, compounds such as water, glycerol, polyglycerol, ethylene glycol, polyethylene glycols, ethanol acetamide, ethanol formamide, and acetates of triethanolamine, glycerin, trimethylolpropane and neopentyl glycol, and mixtures of two or more of the above. The preferred polyglycol used as an anti-dusting agent in this invention is polyethylene glycol having a molecular weight ($M_n$) of about 200 and 600 due to its superior dust suppressant properties after extreme temperature recycling.

Plasticizers that are solid or crystalline at ambient temperatures, such as trimethylolpropane, may be dissolved in water, or another liquid medium that will not offset the plasticization effect, for use as a sprayable plasticizer. Alternatively, however, a plasticizer can be mixed with a polyvinyl alcohol component(s) of a composition hereof when both are dissolved or dispersed in a liquid, or when both are in dry form. When a plasticizer is mixed with polyvinyl alcohol(s) in liquid, the resulting mixture will have to be dried to form a powder containing plasticized polyvinyl alcohol before other steps are taken, such as compaction of the dried mixture. When a polyvinyl alcohol composition containing a plasticizer is compacted, the plasticizer can be added to the composition before or after the compacting step. When a polyvinyl alcohol composition containing a plasticizer is compacted and the plasticizer is added to the composition after compaction into an object, and after granulation of the object, the plasticizer can be added before or after the step of granulation.

Typically the amount of a plasticizer used can vary up to about 40 wt %, or up to about 30 wt %, or up to about 20 wt %, based on the weight of the polyvinyl alcohol component(s). In other embodiments, the amount of plasticizer used in the composition can be in the range of about 0.5 wt % to about 15 wt %, 0.5 wt % to about 10 wt %, 0.5 wt % to about 6 wt %, or about 1 wt % to about 4 wt %, based on the total weight of the composition.

In one embodiment, a composition that yields a combination of good solubility properties and density comprises: (a) from about 60 wt % to about 94 wt % polyvinyl alcohol resin component; (b) from about 5 wt % to about 40 wt % acid-soluble weighting agent; and (c) from about 1 wt % to about 15 wt % plasticizer, based on the combined weight of (a), (b) and (c).

In yet another embodiment, at least one metal ion chelator in the range of from 0.1% to about 5% by weight of the treatment fluid is added to minimize the interaction of the polyvinyl alcohol with the heavy metal ion. The metal ion chelator can be selected from the group consisting of: citric acid (CA), ethylenediaminetetraacetic acid (EDTA), diethylene triamine pentaacetic acid (DTPA), nitrilotriacetic acid (NTA), hydroxyethyl ethylenediamine triacetic acid (HEDTA), diethylene triamine pentaacetic acid (DTPA), glutamic acid diacetic (GLDA), ethylenediaminedisuccinic acid (EDDS), diethanolglycine (DEG), salts thereof, and mixtures thereof.

One or more additives in addition to those named can be incorporated into the compositions as necessary when they are used for downhole treatments. These optional additives include without limitation chelators, anti-oxidants, pH-adjusting agents, oxidizing agents, other lost circulation materials (such as described in the previously incorporated references), scale inhibitors, corrosion inhibitors, clay control additives, iron control additives, reducers, oxygen scavengers and the like.

Particle Size Control

It is proposed herein to provide polyvinyl alcohol compositions that are composed of varying but controlled amounts of particles that are in the small, medium and large size ranges, and thus to obtain a particle size distribution that is relatively dense. For such purpose, it has been found desirable to mix together PVOH particles of differing types and sizes, and such result is obtained herein by mixing together (i) PVOH granules obtained as aforesaid by granulating a body undergoing gelation, (ii) PVOH pellets, and (iii) PVOH powders obtained either (a) by compacting and crushing PVOH fines or dust, or (b) partially crushing PVOH pellets or PVOH granules obtained from gelation. PVOH granules and/or pellets, and both types of PVOH powder (compacted fines and crushed pellets or granules), are thus all PVOH particles, but they are different types of PVOH particles since they do differ in size and shape. PVOH granules, for example, may be described as fitting within the volume of a cuboid, as set forth above, or as having a shape that is subrounded but with high sphericity, similar to squashed oblate spheroid. PVOH pellets are usually cylindrical in shape, but can have a variable cross sectional shape as determined by the die through which a strand is extruded. By contrast, PVOH powder as used herein typically has jagged edges, and may be described as having very angular roundness and low sphericity. However, none of the four types of PVOH particles used herein differs chemically.

One source of a powder to be used herein for compaction purposes is the slurry process. In the slurry process as described above, extremely small PVOH particles (referred to herein as fines and/or dust) are produced in the polyvinyl alcohol composition during hydrolysis by the kneader mixer due to the pushing and shearing action from agitation caused by the kneader blades, and dust is also generated by mechanical attrition in pneumatic conveying and in the dryer cyclone. Thus, a polyvinyl alcohol as a slurry in a liquid solvent can be provided, the liquid can be removed from the PVOH output, and the dried output containing fines and/or dust can be compacted and then crushed. In one embodiment of this invention, the material to be compacted can be the entire output of the slurry reactor, but in other embodiments, the output of the slurry reactor can first be classified by size on a sieve device, and the material to be compacted can be limited to only that portion of the slurry output that is smaller than 325 mesh, or smaller than 200 mesh, or smaller than 140 mesh. PVOH powder can of course also be provided as the output of PVOH processes other than the slurry process, and/or by compacting and/or crushing the output of those other processes when necessary.

Compaction of PVOH, or PVOH in a compositional mixture, can be carried out using conventional compaction methods and equipment, such as a double roll compactor, which places the component(s) to be compacted under extreme pressure. Where the blended component(s) adhere to themselves in the compaction process, no additional binder may be needed to agglomerate the mixture into a compacted object. In other words, the various polyvinyl alcohol components hereof may function as their own binder for the agglomerate. Alternatively, however, as discussed above, additives such as fillers, starches and plasticizers may be added to the composition as necessary to enhance the agglomeration of the component(s) thereof. Desirably such compaction and any ensuing pulverization, is a dry process that does not require an additional drying step.

Resin compaction can be carried out using conventional compaction methods and equipment, such as a double roll compactor. In a double roll compactor, the mixture is fed between two counter-rotating roll presses. Roll compactors with smooth rolls compact a powdered material into an object such as a sheet with consistent hardness. A roller style press combines torque, via a roll drive system, and thrust, via cylinders in a stressed frame, to agglomerate fines. Agglomeration involves a chemical process, in which two counter-rotating rolls press granular material into larger pieces by pulling or pushing fine material into the nip zone of a dual roll press whereupon the rolls pull the material through the roll nip, and produce dense output. The agglomerated materials put out by a double roll compactor typically form an object such as a sheet, ribbon or flakes, have a reduced surface area, and have an increased product bulk density. The rolls apply extreme pressure to press the mixture into a sheet- or ribbon-like form. The object formed by compaction can also be described, for example, as a block, chunk, hunk, lump, strand, cable, cylinder, briquette, or other type of three-dimensional shape, mass or workpiece. Desirably, the pressure applied during compaction is at least 5 T, or at least 10 T. After a certain pressure point, the compaction reaches an effective maximum where there is very little increase in density per unit of additional pressure. In one embodiment of the present invention, this effective maximum is about 30 T of pressure. "T" refers to ton (US)/square inch. Other types of specialized compactors that can be used for compaction of the compositions hereof can also include a briquetter or a single station press.

Once a composition hereof, or a portion of such composition, has been subjected to compaction, especially on a roll mill, the sheet output of the compaction process is passed to a crusher. Where compaction is performed by a roll mill, the crusher is often incorporated directly into the same piece of equipment as the roll mill. The crusher will crush or pulverize the compacted sheet to powder of a predetermined size range wherein such powder is random in shape but is desirably reasonably uniform in size and has a relatively narrow size distribution around the target. The crusher can be adjusted such that it produces powder at a selected, desired size range, such as any of the mesh size ranges set forth herein. A screening device can further sort the powder according to size, and send any that is smaller than a predetermined lower limit back to the compactor, and send any that is larger than a predetermined upper limit back to the crusher. In cases where it is possible to use a briquetter or single station press to make powder in a desired size range directly from compaction, it may not be necessary to further process the powder on a crusher.

The step of crushing a compacted sheet may be performed with a variety of equipment as known in the art and as suitable to a particular situation such as a bead mill, ball mill, jet mill, rod mill, hammer mill or pin mill. A hammer mill, for example, may have cutting blades with either a knife edge for a cleaner cut or a blunt edge for greater impact and breaking force.

PVOH granules, pellets and powder are thus all provided by the various preparations as described above. There is, as a result of such preparations, made available in one embodiment hereof, a process for preparing a particulate polyvinyl alcohol composition, by admixing with the polyvinyl alcohol granules and/or pellets polyvinyl alcohol powder to form the composition, wherein the polyvinyl alcohol powder comprises (i) a selected amount of powder that is smaller than 80 mesh size and yet is 325 mesh size or larger, and/or (ii) a selected amount of powder that is 80 mesh size or larger.

In the above process, the weight of the polyvinyl alcohol powder may be at least about 2 percent, or at least about 3 percent, or at least about 5 percent, or at least about 10 percent, and yet is no more than about 20 percent, or no more than about 18 percent, or no more than about 15 percent, or no more than about 12 percent of the weight of the PVOH granules and/or pellets with which the powder is admixed. Also, in this embodiment of the process, the granules, the pellets, the powder and/or the particulate composition formed from admixing the powder with the granules can each, two or all be dried, if desired, to reduce the content of a monohydric alcohol therein to less than about 5 wt %, or less than about 3 wt %, or less than about 2 wt %, or less than about 1 wt %, or less than about 0.5 wt %. Any of the drying apparatus discussed elsewhere herein can be used for such purpose.

Another embodiment of this invention, which results from the process described immediately above, is a particulate polyvinyl alcohol composition that includes (a) polyvinyl alcohol granules and/or pellets at least about 90 wt %, or at least about 95 wt %, or at least about 98 wt %, or at least about 99 wt % of which have a size that is 35 mesh or larger, or is 25 mesh or larger, or is 18 mesh or larger, or is 14 mesh or larger; and (b) polyvinyl alcohol powder comprising (i) powder that is smaller than 80 mesh size and yet is 325 mesh size or larger, and/or (ii) powder that is 80 mesh size or larger. In this composition, the weight of the polyvinyl alcohol powder may be at least about 2 percent, or at least about 3 percent, or at least about 5 percent, or at least about 10 percent, and yet is no more than about 20 percent, or no more than about 18 percent, or no more than about 15 percent, or no more than about 12 percent, of the weight of the polyvinyl alcohol granules and/or pellets. Also in this composition, the content of a monohydric alcohol in the particles thereof may be less than about 5 wt %, or less than about 3 wt %, or less than about 2 wt %, or less than about 1 wt %, or less than about 0.5 wt %.

In another embodiment hereof, there is provided a particulate polyvinyl alcohol composition that includes polyvinyl alcohol granules and/or pellets at least about 90 wt %, or at least about 95 wt %, or at least about 98 wt %, or at least about 99 wt % of which have a size that is 35 mesh or larger, or is 25 mesh or larger, or is 18 mesh or larger, or is 14 mesh or larger. Also in this composition, the content of a monohydric alcohol in the particles thereof may be less than about 5 wt %, or less than about 3 wt %, or less than about 2 wt %, or less than about 1 wt %, or less than about 0.5 wt %; or the content of a monohydric alcohol therein may be 5 wt % or more, or be 4 wt % or more, or be 3 wt % or more; and yet be 10 wt % or less, or be 8 wt % or less, or be 6 wt % or less.

Another method useful herein for providing PVOH powder is to crush PVOH granules and/or pellets. Such granules and/or pellets can be crushed using the same apparatus described above for crushing a compacted sheet, and such crushing forms a mixture of uncrushed granules and/or pellets, and powder in the form of crushed granules and/or pellets. The mixture of crushed and uncrushed granules and/or pellets that is put out by the crusher forms a particulate composition, and the crusher can be adjusted such that at least about 80 wt %, or at least about 85 wt %, or at least about 90 wt %, or at least about 95 wt % of the particles provided in the mixture of crushed and uncrushed granules and/or pellets has a size that is 80 mesh or larger, or is 60 mesh or larger, or is 40 mesh or larger. Alternatively, PVOH granules and/or pellets, as provided herein, can be crushed in a separate step, and the powder formed thereby can then be mixed with uncrushed PVOH granules and/or pellets to form a composition as described above.

As a result, in another embodiment of this invention, a process hereof may be performed to prepare a particulate polyvinyl alcohol composition by providing polyvinyl alcohol granules and/or pellets at least about 90 wt %, or at least about 95 wt %, or at least about 98 wt %, or at least about 99 wt % of which have a size that is 35 mesh or larger, or is 25 mesh or larger, or is 18 mesh or larger, or is 14 mesh or larger, and crushing the polyvinyl alcohol granules and/or pellets to form the particles of the particulate polyvinyl alcohol composition; wherein the particles of the composition comprise a mixture of crushed and uncrushed granules and/or pellets, and wherein at least about 80 wt %, or at least about 85 wt %, or at least about 90 wt %, or at least about 95 wt % of the particles in the mixture of crushed and uncrushed granules and/or pellets have a size that is 80 mesh or larger, or is 60 mesh or larger, or is 40 mesh or larger.

When a composition is formed in the embodiment as described immediately above, the weight of the polyvinyl alcohol powder present as crushed granules and/or pellets can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules and/or pellets.

Further, if needed, there may be added to the composition formed from the crushed and uncrushed granules and/or pellets supplemental polyvinyl alcohol powder that is smaller than 80 mesh size and yet is 325 mesh size or larger.

When a composition is formed in the embodiment as described immediately above, the weight of the supplemental polyvinyl alcohol powder from other sources can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules and/or pellets plus supplemental powder.

Also, in these embodiments of the processes hereof, the granules, the pellets, the powder and/or the particulate composition formed therefrom can each, two or all be dried, if desired, to reduce the content of a monohydric alcohol therein to less than about 5 wt %, or less than about 3 wt %, or less than about 2 wt %, or less than about 1 wt %, or less than about 0.5 wt %. Any of the drying apparatus discussed elsewhere herein can be used for such purpose.

From the processes described above, there is provided, in another embodiment hereof, a particulate polyvinyl alcohol composition containing a mixture of crushed and uncrushed polyvinyl alcohol granules and/or pellets, wherein at least about 90 wt %, or at least about 95 wt %, or at least about 98 wt, or at least about 99 wt % of the uncrushed granules and/or pellets have a size that is 35 mesh or larger, or is 25 mesh or larger, or is 18 mesh or larger, or is 14 mesh or larger; and wherein at least about 80 wt %, or at least about 85 wt %, or at least about 90 wt %, or at least about 95 wt % of the particles in the mixture of crushed and uncrushed granules and/or pellets have a size that is 80 mesh or larger, or is 60 mesh or larger, or is 40 mesh or larger.

In the above described composition, the weight of the polyvinyl alcohol powder that is present as crushed granules and/or pellets can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules and/or pellets.

Further the composition described above may also contain supplemental polyvinyl alcohol powder that is smaller than 80 mesh size and yet is 325 mesh size or larger. The weight of the supplemental polyvinyl alcohol powder from other sources in the above composition can be at least about 2 percent, or at least about 3 percent, or at least about 5 percent, or at least about 10 percent, and yet is no more than about 20 percent, or is no more than about 18 percent, or is no more than about 15 percent, or is no more than about 12 percent, of the weight of the composition formed from the crushed and uncrushed polyvinyl alcohol granules and/or pellets plus the supplemental powder.

Also in any of the above compositions, the content of a monohydric alcohol therein may be less than about 5 wt %, or less than about 3 wt %, or less than about 2 wt %, or less than about 1 wt %, or less than about 0.5 wt %.

When it is desired to prepare compositions herein by mixing PVOH granules and/or pellets with PVOH powder, the granules and/or pellets as described above can be provided by selecting the appropriate setting on the granulator to provide the desired size of granule, or by selecting the appropriate setting on the strand cutter to provide the desired size pellet. The PVOH powder to be mixed with granules and/or pellets in such a composition can be provided, as described above, by compacting PVOH dust to form a slab and then crushing the slab. To be able to provide an inventory of powders of different sizes to be used in desired amounts for admixture with granules and/or pellets to form compositions, the supply of powder can be classified according to size to permit collection of suitable amounts of various sizes to serve as stock for supplying the powder component in such mixtures.

Size classification, or grading or sorting a batch of powder particles according to size, is often performed on a mechanical shaker having the ability to obtain separation using sieves. A typical sieve separator involves a nested column of sieves, each sieve being formed from wire mesh cloth or screen. The sieve in the top pan has the largest mesh openings, and each succeeding pan below has progressively smaller size mesh openings such that each lower sieve in the column receives particles that were not retained on the larger mesh openings of the sieve immediately above it. At the base is a round pan with no openings, called the receiver, which collects all particles that were too small to be retained on any of the sieve screens above.

The sieve openings, or mesh sizes, of the various screen-bottomed pans are selected to be the same as the various sizes of particles desired for use in preparing compositions, and each pan of such selected size will retain powder particles that are large enough that they do not fall through. The column is vibrated by a mechanical shaker, usually for a fixed amount of time, and the shaking action gives the particles in the batch of powder that was originally placed on the top screen enough motion to either be retained on a screen or fall through to the bottom collector pan. Those that do not fall through form the supply of particles of the selected sizes to be used as mixing components. The particles retained on each pan are removed and stored, and later serve as the inventory for supplying particles in admixture with granules and/or pellets, where the mixture can be prepared based on a formulation that calls for particular amounts of powdered particles that have a particular size classification. The amounts needed of each size needed are withdrawn from inventory and added to the mixture being formed. This approach provides great flexibility when determining what relative amounts of powdered particles of what size it is desired to add to a composition being formed.

In an alternative embodiment of any of the processes set forth above, there may be further provided a step of contacting the polyvinyl alcohol particles of the composition with a plasticizer prior to sorting the particles according to size.

The different compositions disclosed herein, or formed by the processes disclosed herein, may in various embodiments that are alternatives to, or alternative aspects of, particle size characterizations set forth elsewhere herein, have a particle size distribution described by one or more of the following size ranges:

A composition wherein at least about 97.5 wt %, or at least about 99 wt %, or at least about 99.5 wt %, of the polyinyl alcohol particles have a particle size of 325 mesh or larger.

A composition wherein at least about 96 wt %, at least about 98 wt %, or at least about 98.5 wt %, of the polyinyl alcohol particles have a particle size of 200 mesh or larger.

A composition wherein at least about 95 wt %, or at least about 97 wt %, or at least about 98 wt %, of the polyinyl alcohol particles have a particle size of 140 mesh or larger.

A composition wherein at least about 85 wt %, or at least about 90 wt %, or at least about 95 wt %, of the polyinyl alcohol particles have a particle size of 80 mesh or larger.

A composition wherein at least about 80 wt %, or at least about 85 wt %, or at least about 90 wt %, of the polyinyl alcohol particles have a particle size of 50 mesh or larger.

A composition wherein at least about 75 wt %, or at least about 80 wt %, or at least about 85 wt %, of the polyinyl alcohol particles have a particle size of 35 mesh or larger.

A composition wherein at least about 65 wt %, or at least about 70 wt %, or at least about 75 wt %, of the polyinyl alcohol particles have a particle size of 20 mesh or larger.

A composition wherein at least about 55 wt %, or at least about 60 wt %, or at least about 65 wt %, of the polyinyl alcohol particles have a particle size of 12 mesh or larger.

In yet another embodiment of a composition hereof, the particle size distribution of the particles of the composition may be described by a set of values falling within the stated content ranges for a combination of two or more of the mesh screen sizes listed above.

In another embodiment, a composition of this invention may have a content of free dust or fines of polyvinyl alcohol polymer in an amount of less than about 3%, or less than about 2.5%, or less than about 2%, or less than about 1.5%, or less than about 1%. Content of free dust or fines may be determined quantitatively as the weight percent of free dust or fines of a sample of polyvinyl alcohol that could be eluted from the sample with $4.7 \times 10^{-4}$ m³/s (1.0 cfm) of air in 5 minutes using an open "ACE" B (70~100 micron) porosity fritted funnel as the sample receptacle. The process for determining the content of free dust or fines in a sample is more fully described in U.S. Pat. No. 4,389,506.

In any of the methods as described above, the type and amount of particles to be added is desirably determined in a manner to balance the content of the other size fractions in the composition to give a composition that has a negligible amount of dust but that does not have a disproportionate amount of large particles either, as dictated by the needs of the intended use of the composition. Thus a composition having a relatively dense particle size distribution or gradation may be provided in which most of the particles are in the medium to large size ranges but there are still enough small particles to fill the voids between the larger particles.

Uses of the Copolymers Hereof, and Compositions Prepared Therefrom

The compositions hereof can also be used in fluid injection operations for treatment of subsurface wells and wellbores by processes as generally known in the art, and as exemplified in references such as U.S. Pat. Nos. 3,724,549, 4,665,986, WO 2006/088603A1, U.S. Pat. Nos. 5,105,885, 5,207,831, US2006/0041060A1, EP0587383A1, US2018/0187060A1, WO2018/231236A1 and WO2019/031613A1. These compositions are particularly suitable for use in subterranean formations where formation temperatures are typically about 200° F. or lower, although in other cases these compositions can also have suitable stability for sufficient time periods for use at temperatures of up to about 250° F. When a composition hereof is being used for a downhole treatment, the particle size distribution sought to be obtained from the processes and methods of this invention can vary widely depending on the permeability of the substrate, the nature of the carrier fluid, the subsurface temperature profile, and the particular polyvinyl alcohol composition being used.

This invention therefore further provides a method of reducing the loss of one or more desired fluids from a subsurface formation, or from the confines of a wellbore installed within such formation, comprising treating an opening in a wall of the formation with a composition according to this invention. Performing such a method typically involves applying the composition to the wall of the formation, and to the opening therein, to temporarily or permanently seal the opening therein. Access to the opening in the wall is obtained from the wellbore, or from a device that has been inserted in the wellbore and used for that purpose.

As indicated above, during drilling operations for oil production from subterranean formations, drilling fluids are pumped down through the drill pipe, through openings in the drill bit, and then upward to ground level, where the fluid is screened of the accumulated cuttings and is recirculated through the system. The functions of the drilling fluids include, for example, to lubricate the drilling tool and drill pipe; to provide a medium for removing formation cuttings from the well to the surface; to counterbalance formation pressure in order to prevent the inflow to the well bore of gas, oil and/or water from permeable or porous formations that may be encountered at various levels as drilling progresses; to maintain hole stability prior to setting the casing; to minimize formation damage; and to hold the drill cuttings in suspension.

It is necessary for the drilling fluid to circulate in the wellbore (down the drill pipe and back up the annulus) in order to perform all of the desired functions. A problem that sometimes occurs in the oil field is the loss of the drilling fluids into the permeable zones of the wellbore from unwanted flow ("leaks") in and out of voids, vugular zones or natural or induced fractures at undesired locations ("leaking zones") up and down the length of the wellbore. Such leaks can dramatically increase the costs of the drilling operation, and in order to minimize the loss of the circulation fluids, it is desirable to plug the flow passages in the leaking zones where the leaks responsible for the fluid losses are occurring.

Drilling fluids are designed to seal porous formations while drilling, and this occurs as the result of suction of the fluid onto the permeable surface (pressure greater in the well than in the formation) and the creation of a mud cake to seal a porous formation during drilling and for the purpose of wellbore stabilization. The loss of fluids to leaking zones can reach an extent such that no mud cake can be created to secure the surface and create an effective barrier. In extreme situations, when the borehole penetrates a fracture in the formation through which most of the drilling fluid may be lost, the rate of loss may exceed the rate of replacement. Drilling operations may have to be stopped until the lost circulation zone is sealed and fluid loss to the fracture is reduced to an acceptable level. In the worst case, the consequences of this problem can be loss of the well.

Several techniques have been developed or proposed to cure or to reduce the lost circulation of mud and other drilling fluids to leaking zones of the wellbore. For example, certain drilling fluid additives can form a thin, low permeability filter cake that can seal openings in formations to reduce the unwanted influx of fluids or the loss of drilling fluids to permeable formations, or to bridge or block seepage into the formation can also be added to the drilling fluid. A multitude of stand-alone sealing compositions have also been proposed in the art for the specific purpose of remediating the problems encountered in hydrocarbon production with respect to leaks by plugging the passageways in and out of leaking zones.

A sealing composition can be pumped down the wellbore at high pressure and into the leaking zone(s) to be plugged, and the sealing composition will enter the weakest portions of the zone first followed then by other portions including those where fluids crossflow through the wellbore or blow out into the wellbore. The sealing composition stops the loss of service fluids and allows high drilling fluid densities to be utilized when needed while drilling ahead. Once the sealing composition has been placed, it increases the fracture gradient to a higher value that can eliminate the need for intermediate casing, drilling liners and the like. Because the sealing composition readily diverts to other weak zones in the well bore, the integrity of the entire well bore is improved by the sealing composition.

In one embodiment, a sealing composition can be placed into a wellbore in the form of a "single pill" fluid; that is, all components of the sealing composition are mixed and introduced into the wellbore as a single composition and as a single stream. In such case, the sealing composition is typically activated by downhole conditions to form a seal in one or more leaking zones, and for such purpose the sealing composition may be placed downhole through multiple ports in the drill bit.

In an alternative embodiment, the sealing composition can be formed downhole by the mixing of a first stream containing one or more sealing components and a second stream containing additional sealing components. In such an embodiment, the compositional components can be selected such that the first and second streams react with each other, or one group of components can be encapsulated an introduced in that form instead of as a stream. When differing groups of components are introduced as independent fluid streams, one of them may be introduced through the tubular string of drill pipe, and the other may be introduced in the anulus between the drill string and the wall of the borehole.

Methods for introducing sealing compositions into a wellbore to plug leaks in leaking subterranean zones are further described in U.S. Pat. Nos. 5,913,364, 6,167,967 and 6,258,757. Moreover, it is proposed herein that the hydrophobic copolymers hereof would make an exceptionally valuable component of a sealing composition because of the opportunity to modify the solubility behavior of the copolymer by modifying the olefinic comonomer content, the degree of hydrolysis, the degree of polymerization and/or crystallinity thereof as desired. The temperature range of the fluid in the wellbore required to obtain substantial or complete dissolution of a sealing composition containing a hydrophobic copolymer hereof can thus be raised or lowered as desired by modifying one or more of the polymer properties listed in the previous sentence. A leak plug formed from a sealing composition containing a hydrophobic copolymer of this invention can thus be made to be as durable as needed within a first temperature range, but can still be easily be removed from the well when desired by exposing the leak plug to a second, higher temperature range at some future time.

In yet other embodiments of the inventions hereof, there is disclosed a method of reducing the loss of one or more desired fluids from a subsurface formation, or from the confines of a wellbore installed within such formation, comprising applying a particulate vinyl alcohol composition to a wall of the formation that is accessible from the wellbore; wherein the composition is prepared from polyvinyl alcohol granules and/or pellets at least about 90 wt %, or at least about 95 wt %, or at least about 98 wt %, or at least about 99 wt % of which have a size that is 35 mesh or larger, or is 25 mesh or larger, or is 18 mesh or larger, or is 14 mesh or larger; and wherein the polyvinyl alcohol granules and/or pellets from which the composition is prepared have a content of a monohydric alcohol that is less than 5 wt %.

EXAMPLES

The following examples will facilitate a more complete understanding of this invention, but it is understood that the invention is not limited to the specific embodiments presented below.

Examples 1 and 2 present a description of the dissolution activity of a hydrophobic, olefinic-modified PVOH copolymer that is characterized by the properties set forth above but is prepared for testing in different particles sizes according to methods that are also set forth above.

The vinyl alcohol copolymer utilized in the testing performed in each of Examples 1 and 2 is a type of copolymer that is produced by copolymerizing a vinyl acetate monomer with an ethylene monomer in a methanolic solution to afford an ethylene/vinyl acetate copolymer. The resulting ethylene/vinyl acetate copolymer in methanolic solution is then converted to a polyvinyl alcohol copolymer by utilizing an alkali catalyst. For ease of handling, actual testing was performed on samples of EXCEVAL™ RS2117 ethylene/vinyl alcohol copolymer, which is commercially available from Kuraray America, Inc. (Houston, Tex. USA) and has the following specifications:

Viscosity of a 4% aqueous solution at 20° C. is about 23.0 to 30.0 mPa-sec, as measured by Brookfield synchronized rotary-type viscometer per DIN 53015;

Degree of hydrolysis is about 97.5 to 99.0 mol %;

Maximum ash content (as $Na_2O$) is about 0.4%;

Maximum volatiles content (after 3 hours drying at 105° C.) is about 5.0%, with methanol content less than 3%; and Weight average molecular weight is about 130,000 g/mol, and number average molecular weight is about 53,000 g/mol, as measured by GPC.

Example 1

The material tested Example 1 is prepared from crushed slabs of compacted copolymer wherein particles obtained from the crushing action are dried, and the dried particles are then sorted according to size to collect a batch of particles in which more than about 90 wt % of the particles have a particle size of 32 mesh or larger, and more than about 60 wt % of the particles have a particle size of 12 mesh or larger, as shown in Table 1.

TABLE 1

Size Distribution of Example 1

| Size | Weight (%) |
|---|---|
| 2800 um | 0.2 |
| 2800-1400 um | 61.6 |
| 1400-500 um | 36.8 |
| 500-355 um | 0.8 |
| 355-250 um | 0.3 |
| 250-180 um | 0.1 |
| 180-150 um | 0.0 |
| <150 um | 0.2 |

The solubility of the material tested in Example 1 was determined by placing 30 grams of the polymer in 470 grams of deionized (DI) water in a vessel equipped with an agitator. The agitator speed inside the dissolution vessel was set at 20 RPM. The timer was started as soon as the temperature inside of the dissolution vessel reached the desired temperature (149° F. or 195° F.). 10 mL of sample in the dissolution vessel was then collected in a centrifuge tube at time (t): 15, 30, 60, 120, 180, 240, 300, 360 and 420 minutes. The 10 mL sample was placed in centrifuge for 10 minutes at 1,500 RPM. The supernatant liquid was filtered through a 200 mesh sieve screen and placed into a pre-weighed aluminum pan. The sample together with the aluminum pan was then placed in an oven set to 105° C. and left overnight to dry. The pan and contents were weighed and the percent solubles are then calculated using the following equation:

Water Solubles (%)=(Weight of Residue plus pan–Weight of pan)*100/(Weight of sample).

The solubility of the same material in salt water (brine) was also determined using the above procedure except that salt water (5.84 grams of sodium chloride added to 994.16 grams of deionized water) was used instead of DI water to dissolve the sample.

The solubility behavior observed when the material of Example 1 was subjected to testing as described above is used to evaluate the rate of disintegration of the material of Example 1. Table 2 shows that after six hours at 149° F., the solubility of Example 1 is less than 20% while after an equivalent time at 195° F., the dissolution is over 99%. Table 3 shows that after six hours at 149° F., the solubility of Example 1 is less than 12%, while after an equivalent time at 195° F., the dissolution was less than 85%.

TABLE 2

Solubility in DI Water of Example 1

| | Time (min) | Dissolution (wt %) @ 149° F. | | Time (min) | Dissolution (wt %) @ 195° F. |
|---|---|---|---|---|---|
| Example 1 | 0 | 0 | Example 1 | 0 | 0 |
| | 15 | 2.5 | | 15 | 46.6 |
| | 30 | 4.0 | | 30 | 86.7 |
| | 60 | 6.6 | | 60 | 98.1 |
| | 120 | 9.8 | | 120 | 97.8 |
| | 180 | 12.3 | | 180 | 99.1 |
| | 240 | 14.2 | | 240 | 99.2 |
| | 300 | 15.5 | | 300 | 99.2 |
| | 360 | 16.5 | | 360 | 99.8 |

TABLE 3

Solubility in 0.5% Brine of Example 1

| | Time (min) | Dissolution (wt %) @ 149° F. | | Time (min) | Dissolution (wt %) @ 195° F. |
|---|---|---|---|---|---|
| Example 1 | 0 | 0.0 | Example 1 | 0 | 0 |
| | 15 | 2.6 | | 15 | 62.4 |
| | 30 | 3.6 | | 30 | 66.3 |
| | 60 | 5.3 | | 60 | 69.9 |
| | 120 | 7.7 | | 120 | 74.1 |
| | 180 | 9.0 | | 180 | 77.5 |
| | 240 | 10.2 | | 240 | 79.9 |
| | 300 | 11.1 | | 300 | 82.4 |

Example 2. The material tested in Example 2 was prepared by compacting the copolymer under pressure. The compaction was carried out using conventional compaction methods and equipment, such as a pilot-scale double roll compactor at room temperature. The resulting compacted samples were crushed using a Fitz mill, 0.5 inch round hole screen. The milled samples were hand sieved to obtain material of a size to pass the 6 mesh screen. The overs were returned to the mill for additional crushing. The compaction and granulation was run as a dry process and the material did not require an additional drying step.

The solubility test discussed in Example 1 above was used to determine the rate of disintegration of the material of Example 2 in DI water. Table 4 shows that after six hours at 149° F. the solubility of the Example 2 sample in DI water is less than 30% indicating that the material can be used at temperatures well above 150° F.

TABLE 4

Solubility in DI Water of Example 2

| | Time (min) | Dissolution (wt %) @ 149° F. |
|---|---|---|
| Example 2 | 0 | 0 |
| | 15 | 9.8 |
| | 30 | 12.3 |
| | 60 | 17.0 |
| | 120 | 21.8 |
| | 180 | 23.1 |
| | 240 | 25.1 |
| | 300 | 26.2 |

Example 3. A sample of hydrophobically modified polymer that is plasticized and filled with $CaCO_3$ can be prepared by spraying the EXCEVAL™ RS2117 with 1.5 parts of CARBOWAX™ polyethylene glycol plasticizer (Dow Chemical). The plasticized polymer can then be uniformly blended with 5 wt. % of $CaCO_3$. The uniform blend composed of the resin, plasticizer and filler can then then compacted by placing it between two counter-rotating rolls of a double roll compactor applying 20 T of pressure to press the mixture into a sheet-like form. This sheet of material produced can then be fed through a granulator, where it is broken up into sized granules that are random in shape but are desirably reasonably uniform in size. A screener can sort the agglomerated particles according to size. Particle that fall outside the desired size range can be recycled from the screener back to the compactor. The solubility of the plugging agent produced can then be performed in deionized water and brine at 149° F. and at 195° F.

What is claimed is:

1. A plugging agent comprising particles of a compacted polyvinyl alcohol resin component with one or more optional additives, wherein the polyvinyl alcohol resin component comprises a hydrolyzed copolymer of vinyl acetate and an olefinically unsaturated comonomer, wherein:
  (a) the olefinically unsaturated comonomer is selected from the group consisting of ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, 2-butene, 4-methyl-1-pentene, ethyl-1-hexene, cyclohexene, norbornene, styrene, methyl styrene, allyl stearate, vinyl stearate, butadiene and mixtures thereof; and
  (b) the hydrolyzed copolymer has:
    (i) a content of the olefinically unsaturated comonomer in the range of at least about 2 mol %, and yet not more than about 10 mol %;
    (ii) a viscosity-average degree of polymerization in the range of at least about 200, and yet not more than about 5,000;
    (iii) a degree of hydrolysis in the range of at least about 70 mol %, and yet not more than 100 mol %;
    (iv) a degree of solubility in deionized water at a temperature in the range of from about 50° C. to about 70° C., of at least about 3 wt %, and yet not more than about 30 wt %;
    (v) a degree of solubility in deionized water at a temperature in the range of from about 90° C. to about 110° C., of at least about 75 wt %, and yet not more than about 100 wt %;
    (vi) a degree of crystallinity of at least about 0.2, and yet not more than about 0.55; and
    (vii) an olefinic unit block character of from about 0.90 to about 0.99.

2. The plugging agent of claim 1, wherein the olefinically unsaturated comonomer is ethylene.

3. The plugging agent of claim 1, wherein the polyvinyl alcohol resin component is a mixture of two or more different polyvinyl alcohol resins.

4. The plugging agent of claim 3, wherein the polyvinyl alcohol resin component is a transition product.

5. The plugging agent of claim 1, comprising at least one additive selected from the group consisting of a monovalent metallic salt, a starch, a plasticizer, a metal ion chelator and a filler.

6. The plugging agent of claim 5, comprising a filler.

7. The plugging agent of claim 6, wherein the filler is a weighting agent.

8. The plugging agent of claim 1, where the plugging agent has a particle size distribution wherein:
  (i) the portion of 10 mesh on (U.S. Sieve Series) is from about 10 wt % to about 60 wt %; and
  (ii) the portion of 10 mesh pass and 16 mesh on is from about 40 wt % to about 90 wt %.

9. The plugging agent of claim 1, with a particle size ranging from 3 mesh to 200 mesh (U.S. Sieve Series).

10. The plugging agent of claim 9, wherein the plugging agent has a particle size of from 3 mesh to 18 mesh (U.S. Sieve Series).

11. The plugging agent of claim 1, having a bulk density of about 0.9 g/mL or greater.

12. The plugging agent of claim 1, having a bulk density of from about 0.5 g/ml to about 0.8 g/ml.

13. A method of treating a subsurface formation to divert flow of a fluid from one zone of the subsurface formation to another, by pumping into the subsurface formation an aqueous carrier liquid having dispersed therein a particulate plugging agent comprising particles of a compacted polyvinyl alcohol resin component with one or more optional additives, wherein that the polyvinyl alcohol resin component comprises a hydrolyzed copolymer of vinyl acetate and an olefinically unsaturated comonomer, wherein:
  (a) the olefinically unsaturated comonomer is selected from the group consisting of ethylene, propylene, 1-butene, 1-pentene, 1-hexene, 4-methylpent-1-ene, 1-heptene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecyl, 1-eicosene, 2-butene, 4-methyl-1-pentene, ethyl-1-hexene, cyclohexene, norbornene, styrene, methyl styrene, allyl stearate, vinyl stearate, butadiene and mixtures thereof; and
  (b) the hydrolyzed copolymer has:
    (i) a content of the olefinically unsaturated comonomer in the range of at least about 2 mol %, and yet not more than about 10 mol %;
    (ii) a viscosity-average degree of polymerization in the range of at least about 200, and yet not more than about 5,000;
    (iii) a degree of hydrolysis in the range of at least about 70 mol %, and yet not more than 100 mol %;
    (iv) a degree of solubility in deionized water at a temperature in the range of from about 50° C. to about 70° C., of at least about 3 wt %, and yet not more than about 30 wt %;
    (v) a degree of solubility in deionized water at a temperature in the range of from about 90° C. to about 110° C., of at least about 75 wt %, and yet not more than about 100 wt %;
    (vi) a degree of crystallinity of at least about 0.2, and yet not more than about 0.55; and
    (vii) an olefinic unit block character of from about 0.90 to about 0.99.

14. The method of claim 13, where the plugging agent is temporary and subsequently removed by dissolution.

15. The method of claim 13, wherein the treating is done at a temperature of 200° F. or less.

* * * * *